Figure 1:
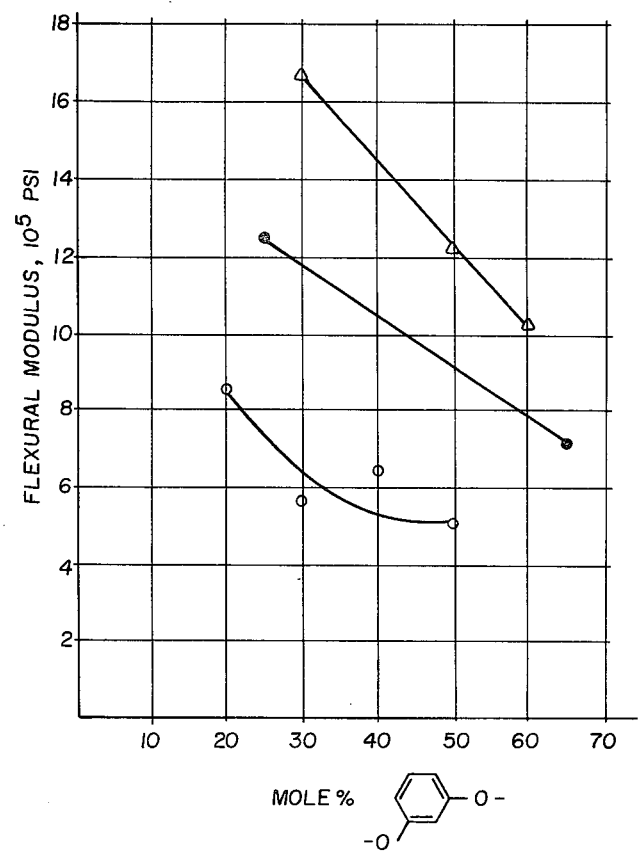

United States Patent [19]

Jackson, Jr. et al.

[11] 4,156,070

[45] May 22, 1979

[54] LIQUID CRYSTAL COPOLYESTERS PREPARED FROM AN AROMATIC DICARBOXYLIC ACID, A SUBSTITUTED HYDROQUINONE AND RESORCINOL

[75] Inventors: Winston J. Jackson, Jr.; John C. Morris, both of Kingsport, Tenn.

[73] Assignee: Eastman Kodak Company, Rochester, N.Y.

[21] Appl. No.: 822,983

[22] Filed: Aug. 8, 1977

[51] Int. Cl.$^2$ .................... C08G 63/18; C08G 63/68
[52] U.S. Cl. .................................... 528/191; 528/193
[58] Field of Search .............. 260/47 C; 528/191, 193

[56] References Cited

U.S. PATENT DOCUMENTS

| | | | |
|---|---|---|---|
| 3,036,990 | 5/1962 | Kantor et al. | 260/47 |
| 3,160,602 | 12/1964 | Kantor et al. | 260/47 |
| 3,368,998 | 2/1968 | Goodman et al. | 260/47 |
| 3,991,013 | 11/1976 | Pletcher | 260/47 C |
| 3,991,014 | 11/1976 | Kleinschuster | 260/47 C |

Primary Examiner—Lester L. Lee
Attorney, Agent, or Firm—William P. Heath, Jr.; Daniel B. Reece, III

[57] ABSTRACT

Disclosed are liquid crystal copolyesters prepared from an aromatic dicarboxylic acid, a substituted hydroquinone and resorcinol. These copolyesters contain the following divalent radicals:

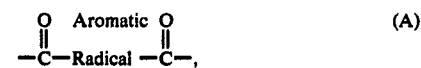

(A)

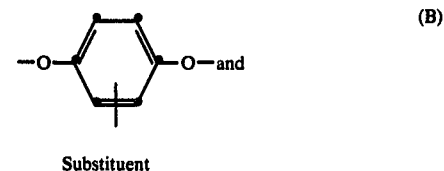

(B)

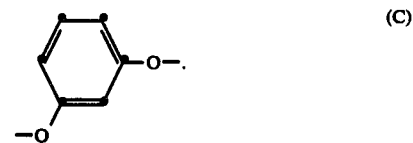

(C)

4 Claims, 1 Drawing Figure

LIQUID CRYSTAL COPOLYESTERS PREPARED FROM AN AROMATIC DICARBOXYLIC ACID, A SUBSTITUTED HYDROQUINONE AND RESORCINOL

This invention relates to copolyesters which exhibit unobvious mechanical properties.

The use of objects molded from synthetic polymers has expanded rapidly in the last several decades. In particular, polyesters have widely gained acceptance for general molding applications. Although most polyesters have mechanical properties suitable for general molding applications, most polyesters are not suitable for high strength service because the mechanical properties are not sufficiently high. One group of polyesters that is suitable for high strength service without the need of a reinforcing agent is a new class of polymers exhibiting a general overall balance of mechanical properties substantially enhanced over previous polymers. These polymers have been described by various terms, including "liquid crystalline", "liquid crystal", and "anisotropic". Briefly, the polymers of this new class are thought to involve a parallel odering of the molecular chains. The state wherein the molecules are so ordered is often referred to either as the liquid crystal state or the nematic phase of the liquid crystal state. These polymers are prepared from monomers which are generally long, flat and fairly rigid along the long axis of the molecule and have chain extending linkages that are either coaxial or parallel.

Although the exact structure of liquid crystal polymers has not yet been fully understood, liquid crystal polymers are known to have exceptionally high mechanical properties compared to analogous polymers not having a liquid crystal characters. For example, in U.S. Pat. No. 3,804,805, it is reported that a liquid crystal polyester prepared by the acidolysis of polyethylene terephthalate with 60 mole percent p-acetoxybenzoic acid has a flexural modulus of almost $18 \times 10^5$ psi., compared to a flexural modulus of only about $3 \times 10^5$ psi. for an analogous polyester prepared by an ester interchange procedure using dimethyl terephthalate, ethylene glycol, and 60 mole percent methyl p-hydroxybenzoate.

Applicants have now invented liquid crystal copolyesters that exhibit mechanical properties sufficiently high to make the copolyesters suitable for various kinds of high strength service without the necessity of a reinforcing agent.

Very broadly, the copolyesters of this invention are comprised of the following divalent radicals:

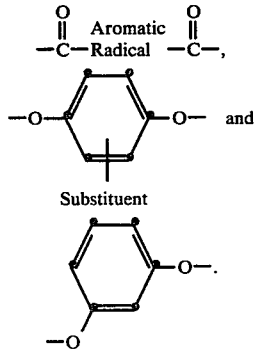

In this invention the amount of radical (C) is from about 20 to about 65 mole percent, based on the total moles of radical (B) and radical (C) combined. Preferably the amount of radical (C) is 30 to 50 mole percent.

Applicants are aware of a large volume of prior art relating to the copolyesters of this invention.

U.S. Pat. No. 3,637,595 discloses liquid crystal copolyesters which are prepared from terephthalic acid, hydroquinone, resorcinol and p-hydroxybenzoic acid and contain the following divalent radicals:

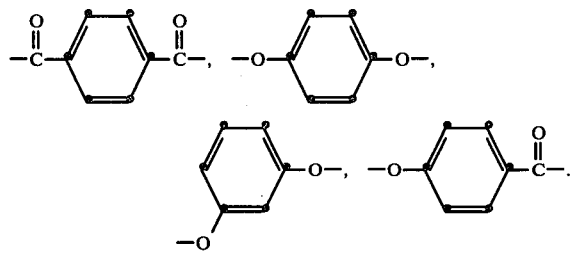

U.S. Pat. No. 3,778,410 discloses preparation of a polyester from an aromatic dicarboxylic acid, hydroquinone and resorcinol.

U.S. Pat. No. 3,890,256 discloses liquid crystal polyesters prepared from poly(ethylene terephthalate), a substituted hydroquinone and an acryloxybenzoic acid.

U.S. Pat. No. 3,804,805 discloses liquid crystal polyesters prepared from polyethylene terephthalate and an acryloxybenzoic acid.

Belgium Pat. No. 828,935 discloses liquid crystal polyesters wherein a substantial portion of the rings in the polymer chain contain a substituent or a substantial portion of the rings in the polymer chain have chain extending linkages which are neither coaxial or parallel.

German Offenlegunsschrift No. 2,520,820 contains a disclosure similar to Belgium Pat. No. 828,935.

U.S. Pat. No. 3,036,992 discloses copolyesters prepared from hydroquinone, resorcinol, isophthalic acid, and terephthalic acid.

U.S. Pat. No. 3,160,604 discloses copolyesters prepared from terephthalic acid, resorcinol, and hydroquinone.

The copolyesters of this invention are thought to be novel over U.S. Pat. No. 3,778,410 because the copolyesters of this invention are limited to a specific range of divalent radical (C). The copolyesters of this invention are thought to be unobvious over this patent because this patent does not disclose use of a substituted hydroquinone and also this patent does not disclose the specific range of radical (C).

The copolyesters of this invention are thought to be novel over U.S. Pat. No. 3,637,595 because the copolyesters of this invention are described as "consisting essentially of" the various divalent radicals and would therefore exclude polyesters containing p-hydroxybenzoic acid. The polyesters of this invention are thought to be unobvious over this reference because the flexural modulus of the copolyesters of this invention are unobvious in view of the flexural modulus of the polyesters of this reference containing p-hydroxybenzoic acid. Stated another way, it would be unobvious to remove the p-hydroxybenzoic acid from the polyesters disclosed in this reference and obtain enhanced flexural modulus because it is known in the art the divalent radical contributed from p-hydroxybenzoic acid produces liquid crystal polyesters with an extremely high flexural modulus.

The precise manner in which the flexural modulus of the copolyesters of this invention are unobviously higher than the flexural modulus of the polyesters disclosed in U.S. Pat. No. 3,637,595 is illustrated in the FIGURE.

The FIGURE is a graph showing the relationship between the flexural modulus and the amount of the divalent radical

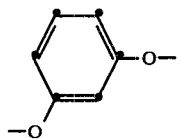

contributed from resorcinol in both the copolyester of the invention not containing p-hydroxybenzoic acid and the copolyester of the prior art containing p-hydroxybenzoic acid.

In the FIGURE the mole percent of divalent radical (C), based on the total amount of divalent radicals (B) and (C) combined, has been plotted on the abscissa. The flexural modulus has been plotted on the ordinate. Data points for the flexural modulus have been plotted for both the copolyesters of the invention and the copolyesters of the prior art and suitable curves have been drawn. In the FIGURE the upper curve through the triangular data points represents the flexural modulus of the copolyesters of the invention prepared from 2-chlorohydroquinone. The middle curve through the solid circular data points represents the flexural modulus of the copolyesters of the invention prepared from 2-methylhydroquinone. The lower curve through the open circular data points represents the flexural modulus of the copolyesters of the prior art.

The flexural modulus data for the copolyesters disclosed in U.S. Pat. No. 3,637,595 were obtained by preparing these copolyesters, injection molding at 310–350° C., and determining the flexural modulus in accordance with ASTM D790.

The data of the copolyesters of the invention were obtained by preparing each of the copolyesters using a process known in the art, injection molding at 310°–350° C., and then determining the flexural modulus of each polyester in accordance with ASTM D790.

The copolyesters of the invention were prepared by an acidolysis procedure whereby terephthalic acid, a diester of either 2-chlorohydroquinone or 2-methylhydroquinone and a diester of resorcinol are contacted under an increasing temperature ranging up to about 340°–380° C. and a decreasing pressure to form a high molecular weight polymer. As a specific example, the copolyester prepared from 2-chlorohydroquinone containing 30 mole percent divalent radical (C) was prepared by the following procedure.

A mixture of 116.2 g (0.70 mole) terephthalic acid, 117.2 g (0.49 mole) chlorohydroquinone diacetate, and 46.6 g (0.21 mole) resorcinol diacetate is placed in a 500-ml flask equipped with a stirrer, a short distillation column, and an inlet for nitrogen. The flask is evacuated and purged three times with nitrogen before being lowered into a Wood's metal bath at 275° C. The mixture is stirred for one hour at 275° C. under nitrogen while most of the acetic acid distills. The temperature is raised to 300° C. for 30 minutes to insure complete reaction of the terephthalic acid. The temperature is then gradually raised to 350° C. over the next 30 minutes, and a vacuum of 0.5 mm is applied. The temperature is raised to 360° C. and the polymerization is complete within about 20 minutes. A gray, opaque, fibrous, high melt viscosity polymer is obtained. The polymer has an inherent viscosity of 0.69.

The other copolyesters of the invention prepared from 2-chlorohydroquinone and containing 50 and 60 mole percent divalent radical (C) were prepared by a similar procedure. The other copolyesters of the invention which were prepared from 2-methylhydroquinone and contain 25 and 65 mole percent divalent radical (C) were also prepared by a similar procedure.

As can be fully appreciated from a detailed consideration of the curves in the Figure, the flexural modulus of the copolyesters of the invention are unobviously high compared to the flexural modulus of the p-hydroxybenzoic acid containing copolyesters of the prior art. For example, consider a typical copolyester of the invention and a typical copolyester of the prior art each containing 40 mole percent divalent radical

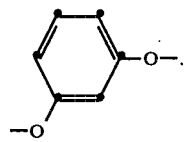

As can be determined from the Figure, the flexural modulus of the p-hydroxy benzoic acid containing polyester of the prior art is around $6.5 \times 10^5$ psi, while the flexural modulus of the 2-chlorohydroquinone containing copolyester of the invention is around $14.5 \times 10^5$ psi or about 123% higher than the analogous copolyester of the prior art. Also as can be determined from the Figure, the flexural modulus of the copolyester of the invention prepared from 2-methylhydroquinone containing 40 mole percent divalent radical (C) is about $10.5 \times 10^5$ psi, or about 60% higher than the flexural modulus of the copolyester of the prior art.

It would be unobvious that the flexural modulus of the copolyester of the invention not containing p-hydroxybenzoic acid would be substantially higher than the flexural modulus of the analogous p-hydroxybenzoic acid containing copolyester because one would think that elimination of the radical contributed from p-hydroxybenzoic acid would not enhance the flexural modulus because this radical is known to form liquid crystal copolyesters having a very high flexural modulus. For example, in U.S. Pat. No. 3,890,256 polyesters are disclosed that contain this radical and have a flexural modulus as high as $15 \times 10^{15}$ psi. Also in U.S. Pat. No. 3,804,805 polyesters are described having a flexural modulus greater than $17 \times 10^5$ psi.

The dicarboxylic acid that contributes divalent radical (A) to the copolyesters of the invention corresponds to the formula $$HO-\overset{O}{\underset{\|}{C}}-R_1-\overset{O}{\underset{\|}{C}}-OH$$

wherein

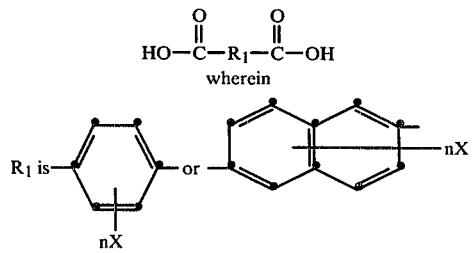

In these structures X is Cl—, Br—, or a monovalent akyl radical having one to three carbon atoms and n is 0, 1 or 2.

Examples of dicarboxylic acids that can be used to prepare the copolyesters of the invention are terephthalic acid, 2-methyl terephthalic acid, 2-propyl terephthalic acid, 2-chloro terephthalic acid, dibromo terephthalic acid, 2,6-naphthalenedicarboxylic acid, 4-methyl-2,6-naphthalenedicarboxylic acid, 1-chloro-2,6-naphthalenedicarboxylic acid, and the like. Terephthalic acid is preferred.

The diacylester of substituted hydroquinone that contributes divalent radical (B) to the copolyesters of the invention corresponds to the structure

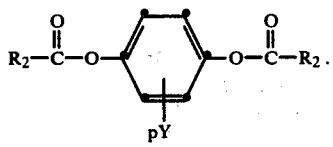

In this structure Y is Cl—, Br— or monovalent alkyl radical having one to three carbon atoms, p is 1 or 2, and $R_2$ is phenyl or a monovalent alkyl radical of 1 to 8, preferably 1 to 4, carbon atoms. Examples of diacylesters of substituted hydroquinone that can be used to prepare the copolyesters of this invention include 2-chlorohydroquinone diacetate, 2-methylhydroquinone dipropionate, 2,6-dimethylhydroquinone dibutyrate, 2,6-dimethylhydroquinone dibenzoate, and 2,5-dichlorohydroquinone dipropionate. The 2-methyl and 2-chloro species are preferred. The 2-chloro species is particularly preferred.

The diacylester of resorcinol that contributes divalent radical (C) to the copolyesters of the invention correponds to the structure

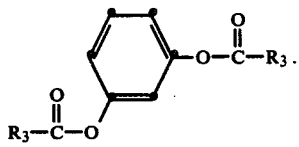

In this structure, $R_3$ is phenyl or a monovalent alkyl radical of 1 to 8, preferably 1 to 4, carbon atoms. Examples of diacyl esters of resorcinol that can be used to prepare the copolyesters of this invention include resorcinol diacetate, resorcinol dipropionate, resorcinol dibutyrate and resorcinol dibenzoate.

The copolyesters of this invention are described as "consisting essentially of" the various radicals. By the term "consisting essentially of" we mean that the copolyesters can contain other divalent radicals, even in significant amounts, as long as the flexural modulus values of the copolyesters of the invention remain unobvious in view of the flexural modulus values of the copolyesters of the prior art. For example, minor amounts of substituted or unsubstituted naphthalenedicarboxylic acid isomers, such as 2,7-, 1,4-, 1,5- and 1,6-, can be used in addition to the 2,6-isomer. Also dicarboxylic acids other than substituted or unsubstituted terephthalic acid or 2,6-naphthalenedicarboxylic acid can be used. Other diols, such as unsubstituted hydroquinone, can be used. By the term "consisting essentially of" we mean also that the copolyesters of this invention can contain nucleating agents, fillers, pigments, glass fibers, asbestos fibers, antioxidants, stabilizers, plasticizers, lubricants, fire-retardants, and other additives.

The inherent viscosity of the copolyesters of this invention is at least 0.4, but can vary widely upward from 0.4. In one embodiment the inherent viscosity of the copolyester is at least 0.6. The inherent viscosity of the copolyester can, if desired, be increased still further to an inherent viscosity of 0.7, 1.0, or even higher, using techniques well known in the art for increasing the molecular weight of linear polyesters, such as solid-state polymerization at 210° to 280° C. under reduced pressure or in a fluidized bed.

The inherent viscosity of the copolyesters of this invention is measured at 25° C. using 0.50 gram of polymer per 100 ml. of a solvent composed of 60 volumes of phenol and 40 volumes of tetrachloroethane.

The copolyesters of this invention are useful for preparing molded objects, films, fibers and the like.

The copolyesters of this invention are used to prepare useful articles using conventional methods and conventional apparatus. For instance, the copolyesters can be formed into fibers by conventional melt spinning techniques and subsequently drafted, heatset and further processed according to techniques well known in the art. The copolyesters can be injection molded using conventional equipment and techniques.

We claim:

1. A copolyester having an inherent viscosity of at least 0.4 measured at 25° C. using 0.50 gram of polymer per 100 ml. of a solvent composed of 60 volumes of phenol and 40 volumes of tetrachloroethane, the copolyester consisting essentially of the following divalent radicals:

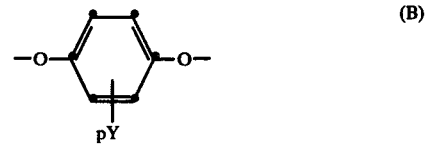

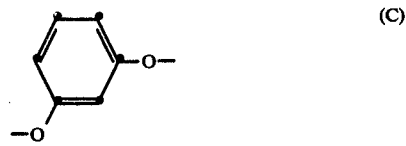

wherein

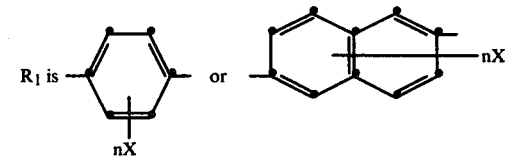

wherein X is Cl—, Br— or a monovalent alkyl radical having one to three carbon atoms and n is 0, 1 or 2,
in radical (B) Y is Cl—, Br— or a monovalent alkyl radical having one to three carbon atoms and p is 1 or 2, and
the range of radical (C) is from 20 to 65 mole percent, based on the total moles of radical (B) and radical (C) combined.

2. The copolyester of claim 1 wherein radical (A) is

3. The copolyester of claim 2 wherein the range of radical (C) is 30 to 50 mole percent.

4. A copolyester having an inherent viscosity of at least 0.6 measured at 25° C. using 0.50 gram of polymer per 100 ml. of a solvent composed of 60 volumes of phenol and 40 volumes of tetrachloroethane, the copolyester containing essentially of the following divalent radicals;

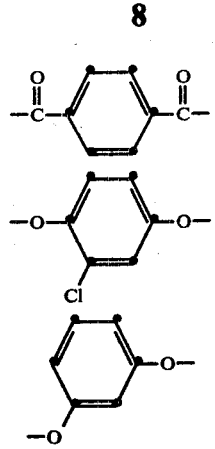

wherein the amount of radical (C) is 30 to 50 mole percent, based on the total moles of radical (B) and radical (C) combined.

* * * * *